(12) United States Patent
Cully et al.

(10) Patent No.: US 12,072,804 B2
(45) Date of Patent: Aug. 27, 2024

(54) MEMORY COHERENCY IN APPLICATION-LEVEL VIRTUALIZATION

(71) Applicant: VMware, Inc., Palo Alto, CA (US)

(72) Inventors: Aidan Cully, St. Augustine, FL (US); Duan Veljko, Temerin (RS); Husheng Zhou, Cedar Park, TX (US); Hyojong Kim, Santa Clara, CA (US)

(73) Assignee: VMware LLC, Palo Alto, CA (US)

( * ) Notice: Subject to any disclaimer, the term of this patent is extended or adjusted under 35 U.S.C. 154(b) by 68 days.

(21) Appl. No.: 18/083,356

(22) Filed: Dec. 16, 2022

(65) Prior Publication Data
US 2024/0202122 A1   Jun. 20, 2024

(51) Int. Cl.
*G06F 12/08* (2016.01)
*G06F 12/0815* (2016.01)

(52) U.S. Cl.
CPC .............................. *G06F 12/0815* (2013.01)

(58) Field of Classification Search
CPC .................................................. G06F 12/0815
USPC ......................................................... 711/141
See application file for complete search history.

(56) References Cited

U.S. PATENT DOCUMENTS

2022/0308936 A1   9/2022 Cully et al.

*Primary Examiner* — Hua J Song
(74) *Attorney, Agent, or Firm* — Kim & Stewart LLP

(57) ABSTRACT

A coherence protocol applied to memory pages maintains coherence between memory spaces on a plurality of nodes so that the threads of the runtime are operable on any of the nodes. The nodes operating according to the coherence protocol track a state and an epoch number for each memory page residing therein. The states include a modified state in which only one particular node has an up-to-date copy of the memory page, an exclusive state in which only one particular node owns the memory page, a shared state in which all nodes that have the memory page in the shared state have the same copy, and a lost state in which the memory page cannot be either read or written. The epoch number is a number that is incremented each time the page enters the modified state and is used to determine whether the page contains data that is stale.

20 Claims, 17 Drawing Sheets

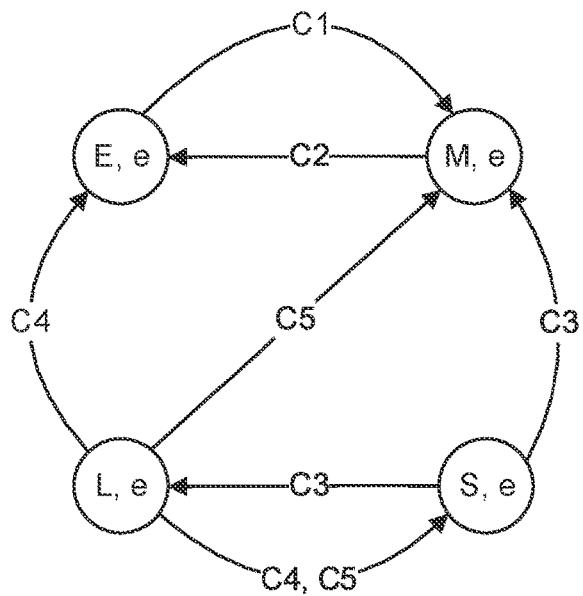
FIG. 6
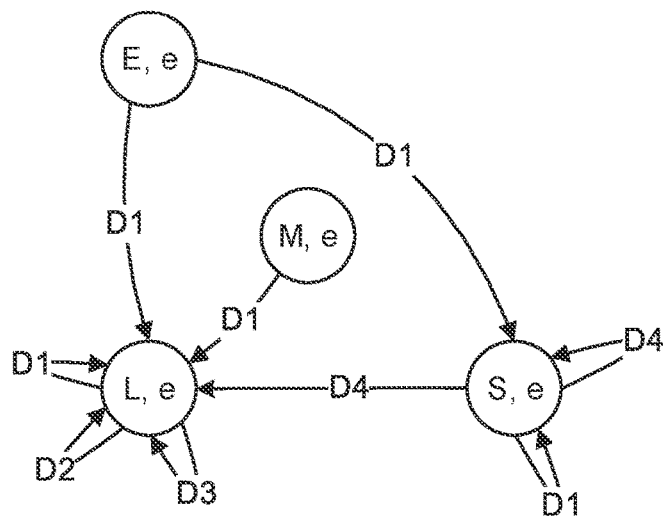
FIG. 7
Node A (nodeID = 0)
| Page | State | Epoch | Owner | CNT |
|------|-------|-------|-------|-----|
| 1234 | E | 10 | - | 0 |
| 1235 | S | 7 | B | 2 |
| 1236 | L | 2 | C | 4 |
| 1237 | M | 21 | - | 0 |
Node B (nodeID = 1)
| Page | State | Epoch | Owner | CNT |
|------|-------|-------|-------|-----|
| 1234 | L | 10 | A | 0 |
| 1235 | S | 7 | B | 2 |
| 1236 | L | 2 | A | 3 |
| 1237 | L | 20 | A | 0 |
Node C (nodeID = 2)
| Page | State | Epoch | Owner | CNT |
|------|-------|-------|-------|-----|
| 1234 | L | 10 | A | 0 |
| 1235 | S | 7 | B | 2 |
| 1236 | E | 2 | - | 4 |
| 1237 | L | 19 | B | 2 |
FIG. 8

MEMORY COHERENCY IN APPLICATION-LEVEL VIRTUALIZATION

BACKGROUND

Data volume is increasing due to artificial intelligence (AI) and machine learning (ML) applications. This increase in data volume requires a commensurate increase in compute power. However, microprocessors cannot supply the needed compute power. Consequently, accelerator hardware, e.g., graphics processing units (GPUs), are taking over many of the compute tasks.

In U.S. patent application Ser. No. 17/493,741, filed Oct. 4, 2021, which is incorporated by reference herein in its entirety, an application with specialized workloads, e.g., AI and ML workloads, is co-executed between an initiator node and an acceptor node equipped with the accelerator hardware. Co-execution relies on maintaining memory coherency among the initiator node and acceptor nodes. When tight memory coherence is needed between the CPUs and GPUs, remote procedure calls (RPCs) are used, which requires high traffic between nodes. Because of the high traffic resulting from RPCs, a solution that can maintain memory coherence without RPCs would be desirable.

SUMMARY

One or more embodiments provide a method for maintaining coherency among memory residing in each node of a set of nodes that are interconnected by a network and include a first node and a second node. The method includes: tracking a state and an epoch number of each page of the memory residing in each of the first node and the second node, wherein the state is one of a modified state, an exclusive state, a shared state, and a lost state in which the page cannot be either read or written, and an epoch number is a number that is incremented each time the page enters the modified state; in connection with performing a write operation on a first page residing in the first node while the first page is in the shared state, sending a request to the second node that the first node needs ownership of the first page, setting the state of the first page residing in the first node to the modified state, and incrementing the epoch number of the first page residing in the first node; and in connection with performing a read operation on a second page residing in the first node while the second page is in the lost state, sending a request to the second node that the first node needs to access the second page, and setting the state of the second page residing in the first node to the exclusive state.

Further embodiments include a computer-readable medium containing instructions that, when executed by a computing device, cause the computing device to carry out one or more aspects of the above method, and a system comprising a memory and a processor configured to carry out one or more aspects of the above method.

BRIEF DESCRIPTION OF THE DRAWINGS

FIGS. 6-7 depict page state transitions according to a memory coherence protocol according to embodiments.

FIG. 8 depicts page state data that are maintained at different nodes to implement the memory coherence protocol according to embodiments.

DETAILED DESCRIPTION

In the embodiments, workloads that are executed in a node having special hardware, e.g., GPU or other accelerator hardware, are co-executed among the initiator node and acceptor nodes, the latter having the special hardware. A memory coherence protocol, referred to herein as MESL protocol, is implemented in one or more embodiments to maintain coherence between memory spaces on the nodes. The protocol is applied to cacheable entities, such as pages, that can be in a modified state (M), an exclusive state (E), a shared state (S), or a lost state (L). The state of each page has an associated epoch number and the nodes compare the epoch numbers of the same page residing locally and in a remote node to track whether the page contains data that is stale or not.

Figure 1:
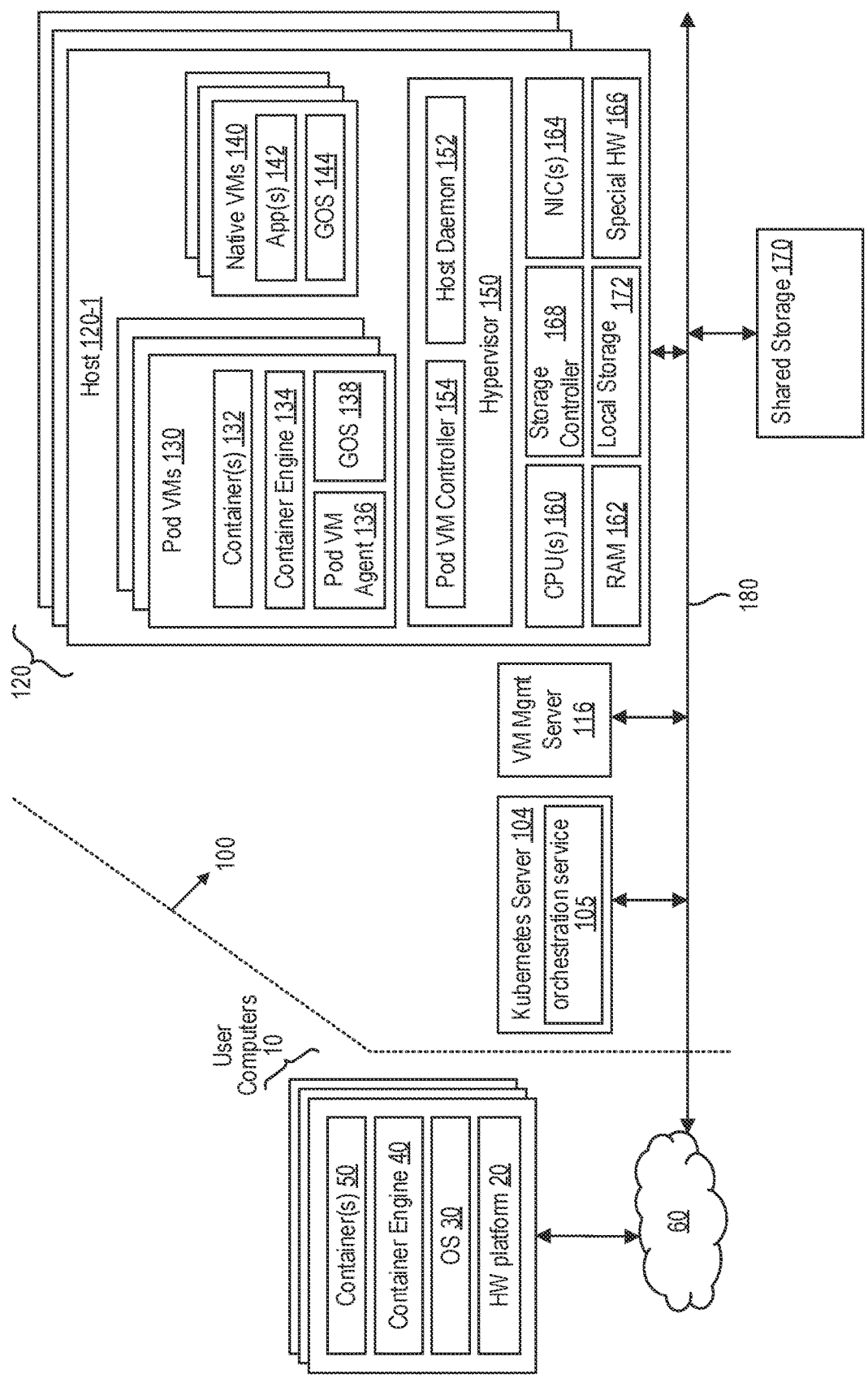
FIG. 1 is a block diagram of user computers connected to a clustered container host system in which embodiments may be implemented.

FIG. 1 is a block diagram of user computers 10 connected to a clustered container host system 100 in which embodiments may be implemented. As depicted, user computers 10 access clustered container host system 100 over a public network 60, e.g., the Internet. Clustered container host system 100 includes a cluster of hosts 120 which may be constructed on a server-grade hardware platform such as an x86 or ARM® architecture platform. The hardware platform includes one or more central processing units (CPUs) 160, system memory (e.g., random access memory (RAM) 162, one or more network interface controllers (NICs) 164, and special hardware 166, e.g., GPU or some other accelerator hardware. A virtualization software layer, also referred to herein as a hypervisor 150, is installed on top of the hardware platform. The virtualization software layer supports a virtual machine execution space within which multiple VMs may be concurrently instantiated and executed. All of hosts 120 are configured in a similar manner as host 120-1, and they are not separately described herein.

In the embodiment illustrated in FIG. 1, each host 120 accesses its local storage (e.g., hard disk drives or solid-state drives) 172 via its local storage controller 168 and accesses shared storage 170 through its NIC 164 and network 180. In another embodiment, each host 120 contains a host bus adapter (HBA) through which input/output operations (IOs)

are sent to shared storage 170 through a storage area network (SAN). Shared storage 170 may comprise, e.g., magnetic disks or flash memory, that is connected to network 180 or the SAN. In some embodiments, the local storage devices of hosts 120 may be aggregated and provisioned as a virtual SAN device that is accessed by hosts 120 as shared storage 170.

VM management server 116 is a physical or virtual server that provisions the VMs from the hardware resources of hosts 120. VM management server 116 logically groups hosts 120 into a cluster to provide cluster-level functions to hosts 120, such as load balancing across hosts 120 by performing VM migration between hosts 120, distributed power management, dynamic VM placement according to affinity and anti-affinity rules, and high-availability. The number of hosts 120 in the cluster may be one or many.

In FIG. 1, a Kubernetes® system, which is implemented in the cluster of hosts 120, is depicted as an example of clustered container host system 100. In this system. Kubernetes server 104 is a virtual server (e.g., one of VMs provisioned by VM management server 116) that communicates with pod VM controllers (e.g., pod VM controller 154 of host 120-1) installed in hosts 120 via network 180. In some embodiments, the Kubernetes server is distributed over the nodes, thus having no single point of failure. An application commonly known as kubectl runs on user computers 10, and an application administrator or developer (hereinafter referred to as the "user"), employs kubectl, and a configuration file (which contains the credentials to authenticate with the Kubernetes server) can issue commands to the Kubernetes server. For example, through kubectl, the user submits desired states of the Kubernetes system, e.g., as YAML documents, to Kubernetes server 104. In response, Kubernetes server 104 schedules pods onto (i.e., assigns them to) different hosts 120 (which are also nodes of a Kubernetes cluster in the embodiments). The pod VM controllers of the different hosts 120 periodically poll Kubernetes server 104 to see if any of the pods have been scheduled to the node (in this example, the host) under its management and execute tasks to bring the actual state of the pods to the desired state. In the embodiments, pods are implemented as pod VMs, which are further described below.

Hypervisor 150 of host 120-1 includes a host daemon 152 and a pod VM controller 154. Host daemon 152 communicates with VM management server 116 to instantiate VMs (both pod VMs 130 and native VMs 140). Each pod VM 130 includes a container engine 134 running on top of guest operating system 138. In addition, a pod VM agent 136 of pod VM 130 communicates with pod VM controller 154 to spin up a set of containers 132 to run in or delete a set of containers 132 running in an execution space managed by container engine 134. Each native VM 140 is an ordinary VM (as distinguished from pod VMs), which includes a guest operating system 144 and applications (e.g., non-containerized applications) running on top of guest operating system 144.

The lifecycle of native VMs 140 is managed by VM management server 116 through host daemon 152. In contrast, the lifecycle of pod VMs 130 is managed by pod VM controller 154 according to the desired state communicated thereto by Kubernetes server 104. In the embodiments, in addition to managing the lifecycle of pod VMs 130, pod VM controller 154 also manages a work queue, which is depicted in FIG. 3, and determines when to suspend and resume pod VMs 130 according to entries in the work queue.

Figure 2:
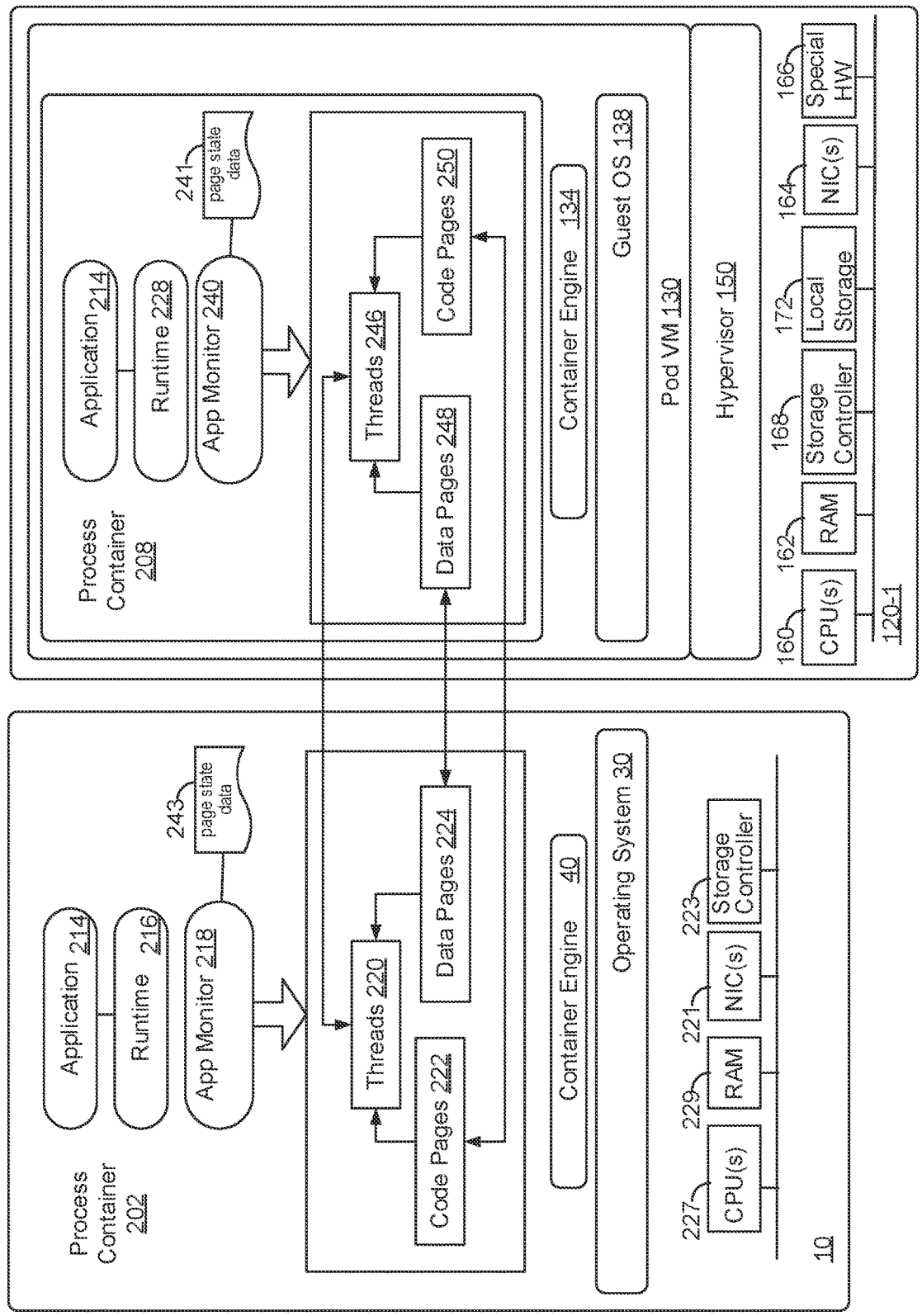
FIG. 2 depicts an application that is co-executed between an initiator node and an acceptor node.

FIG. 2 depicts an application that is co-executed between an initiator node and an acceptor node. User computer 10 is an example of an initiator node, and hosts 120 are examples of acceptor nodes. In user computer 10, operating system 30 runs on top of hardware platform 20 of user computer 10, which includes one or more CPUs 227, system memory (e.g., RAM) 229, one or more NICs 221, and a storage controller 223 connected to local storage (not shown). Process container 202 is a container that runs in an execution space managed by container engine 40. Process container 208 runs in the acceptor node and is a container that runs in an execution space managed by container engine 134 of pod VM 130.

Application 214 is co-executed by process container 202 running in the initiator node and process container 208 running in the acceptor node. In the embodiments depicted herein, process container 208 is spun up in pod VM 130 of host 120-1 because host 120-1 is equipped with much higher processing power than the initiator node and special hardware 166 (e.g., GPU). The initiator node includes a runtime 216 and application monitor 218, one or more threads of execution 220, code pages 222, and data pages 224. The acceptor node includes a runtime 228 and application monitor 240, one or more threads of execution 246, code pages 250, and data pages 248.

Process containers 202, 208 typically run in a lightweight virtual machine or in a namespace provided by an operating system such as the Linux® operating system. In one embodiment, process containers 202, 208 are Docker® containers, runtimes 216, 228 are Python virtual machines, application 214 is a Python program, with libraries such as TensorFlow or PyTorch, and threads of execution 220, 246 correspond to the threads of the Python virtual machine. Application monitor 218 includes a dynamic linker (DL) 244. In general, a dynamic linker is a part of the operating system that loads and links libraries and other modules as needed by an executable code while the code is being executed.

Before co-executing application 214 between the initiator node and the acceptor node, the two nodes are set up. Setup of the initiator node and the acceptor node includes establishing the application monitor and runtimes on each of the nodes on which libraries or other deployable modules are to run, the coherent memory spaces in which the application, libraries, or other deployable modules are located, and the initial thread of execution of each runtime. After the setup is completed, in the course of executing the application on the initiator node, a library or other deployable module is executed on the acceptor node.

Figure 3A:
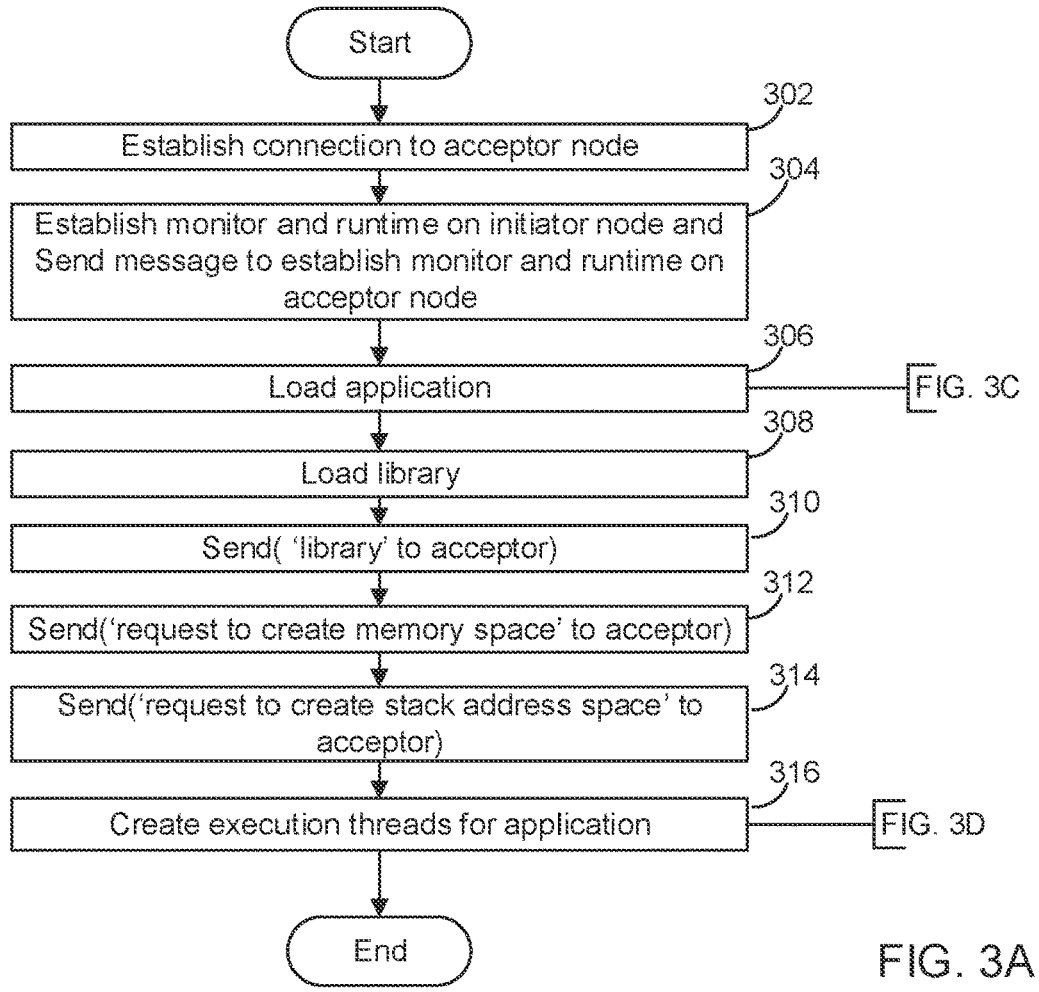
FIG. 3A depicts a flow of operations for an initiator node setup.

FIG. 3A depicts a flow of operations for an initiator node setup. In response to a launch of application 214 in the initiator node, the initiator node establishes a connection to one of hosts 120 that has been selected to operate as the acceptor node in step 302. The selection of one of hosts 120 is made by a scheduler implemented in Kubernetes server 104 of clustered container host system 100. In step 304, the initiator node establishes application monitor 218 and runtime 216 on the initiator node and sends a message requesting that the acceptor node establish an application monitor and runtime thereon. The initiator node prepares a stack frame and assigns the application binary to the stack frame (step 306, further described with reference to FIG. 3C). In step 308, the initiator node loads a library. In step 310, the initiator node sends the loaded library to the acceptor node. In step 312, the initiator node sends a request to create a memory space to the acceptor node so that the application and library operate on the acceptor node in a memory space similar to that on the initiator node. In step 314, the initiator sends a request to create a stack address space to the acceptor node so that the application and library operate on the acceptor node in a stack space similar to that on the acceptor node. In step 316, as further described below with reference to FIG. 3D, the initiator node creates execution threads for application 214.

Figure 3B:
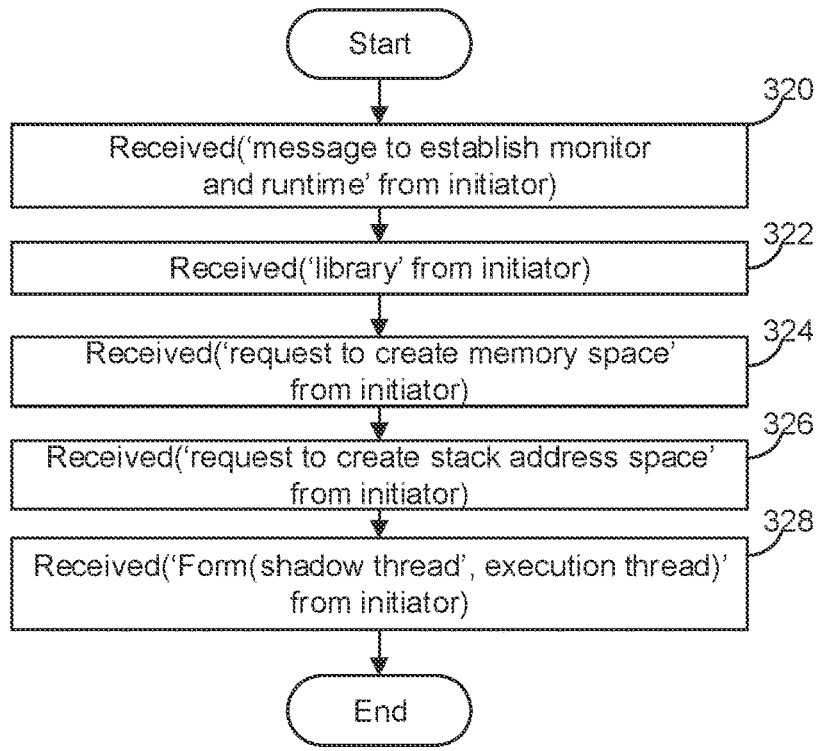
FIG. 3B depicts a flow of operations for an acceptor node setup.

FIG. 3B depicts a flow of operations for an acceptor node setup. The acceptor node receives a message to establish application monitor 240 and runtime 228 in step 320. In step 322, the acceptor node receives the library or other deployable module from the initiator node and, in response, loads the received code for the library or other deployable module. In step 324, the acceptor node receives the request to create memory space from the initiator node and, in response, creates the memory space at the specified location. In step 326, the acceptor node receives a request to create the stack address space from the initiator node and, in response, creates and locates the requested stack address space. The acceptor node then receives, in step 328, a command from the initiator node to form a dual (shadow) thread based on the execution thread in the initiator node and, in response, establishes the requested dual thread.

Figure 3C:
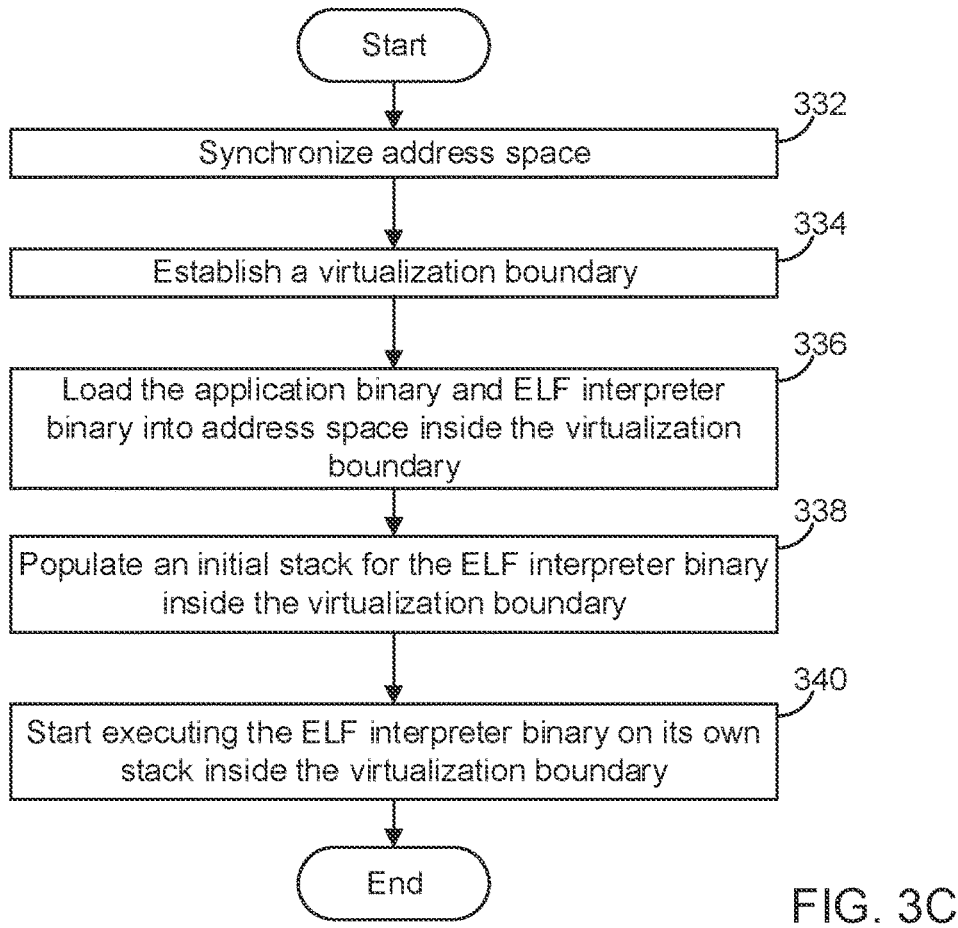
FIG. 3C depicts a flow of operations for loading an application.

FIG. 3C depicts a flow of operations for loading an application (step 306 of FIG. 3A). In step 332, the initiator node synchronizes address spaces so that when a thread on the initiator node has its control transferred to the dual thread on the acceptor node the dual thread operates in the same address space. In step 334, the initiator node establishes a virtualization boundary (in particular, the OS virtualization boundary). Establishing the boundary includes creating a sub-process that shares an address space with its parent process and can have its system calls traced by the parent. The parent process detects the sub-process interactions with the operating system and ensures that these interactions are made coherently with the other node or nodes. In step 336, the initiator node loads the application binary and an ELF (Executable and Linkable Format) interpreter binary into the address space inside the virtualization boundary. The parent process detects this address space manipulation through tracing and keeps the acceptor node coherent with changes made by the sub-process. In step 338, the initiator node populates an initial stack for the ELF interpreter binary inside the virtualization boundary, and in step 340, the initiator node starts executing the ELF interpreter binary on its own stack inside the virtualization boundary. Execution inside the virtualization boundary assures that address spaces and execution policies are coherent between the initiator and acceptor nodes and that any changes made by the runtime are intercepted to maintain consistency of the loaded application.

Executing the ELF interpreter binary inside the virtualization boundary may entail loading a library on the initiator or acceptor node and possibly establishing a migration policy regarding the library (e.g., pinning the library to a node, e.g., the acceptor node). Additionally, the ELF interpreter binary may establish additional coherent memory spaces, including stack spaces needed by the application.

In an alternative embodiment, instead of loading the application binary on the initiator node in step 336, the initiator node sends to the acceptor node a command which contains instructions about how to load the application binary, and the acceptor node processes these instructions to load the application binary thereon.

Figure 3D:
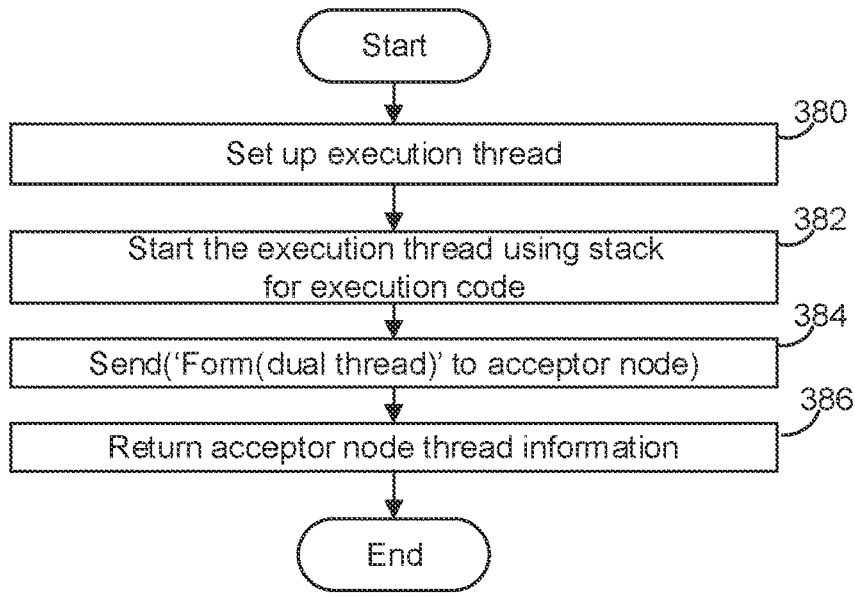
FIG. 3D depicts a flow of operations for creating threads for an application.

FIG. 3D depicts a flow of operations for creating execution threads for application 214 (step 312 of FIG. 3A). In step 380, a thread of execution for the application is set up on the initiator node. In step 382, an execution thread is started in the initiator node using the stack that is created by loading the application binary into the stack frame prepared in step 306. In step 384, a command to form a dual execution thread corresponding to the execution thread started on the initiator node is sent to the acceptor node. In step 386, the thread information is returned. The dual thread is paused or parked, awaiting a control transfer request from the initiator node. When execution moves from one node to another, the state of the processor's registers (register state) of the local thread is recorded and sent to the other node as the local thread is parked. The other node receives the register state and uses it to resume the parked dual thread. In this way, the previously active thread becomes the inactive thread, and the inactive thread becomes the currently active thread. The movement of the active thread is further described with respect to FIGS. 5A and 5B.

The MESL protocol is applied to memory pages, e.g., code pages and data pages described above, to maintain coherence between memory spaces on the nodes so that the threads of the runtime are operable on any of the nodes. The states and associated epoch numbers of the pages are tracked in a data structure managed in each of the nodes by the corresponding application monitor. The data structure managed by application monitor 218 is depicted as page state data 243 and the data structure managed by application monitor 240 is depicted as page state data 241. A detailed description of the MESL protocol, including each of the states and the epoch number, is provided below in reference to FIGS. 6-16.

In one embodiment, a code or data access to a memory page that is pinned to the acceptor node causes execution migration of the thread to the acceptor node, followed by migration of the memory page. In an alternate embodiment, upon a fault caused by an instruction accessing a code or data page on the acceptor node because the page is not present on the acceptor node, only the instruction is executed on the node having the code or data page, and the results of the instruction are transferred over the network to the acceptor node.

Figure 4A:
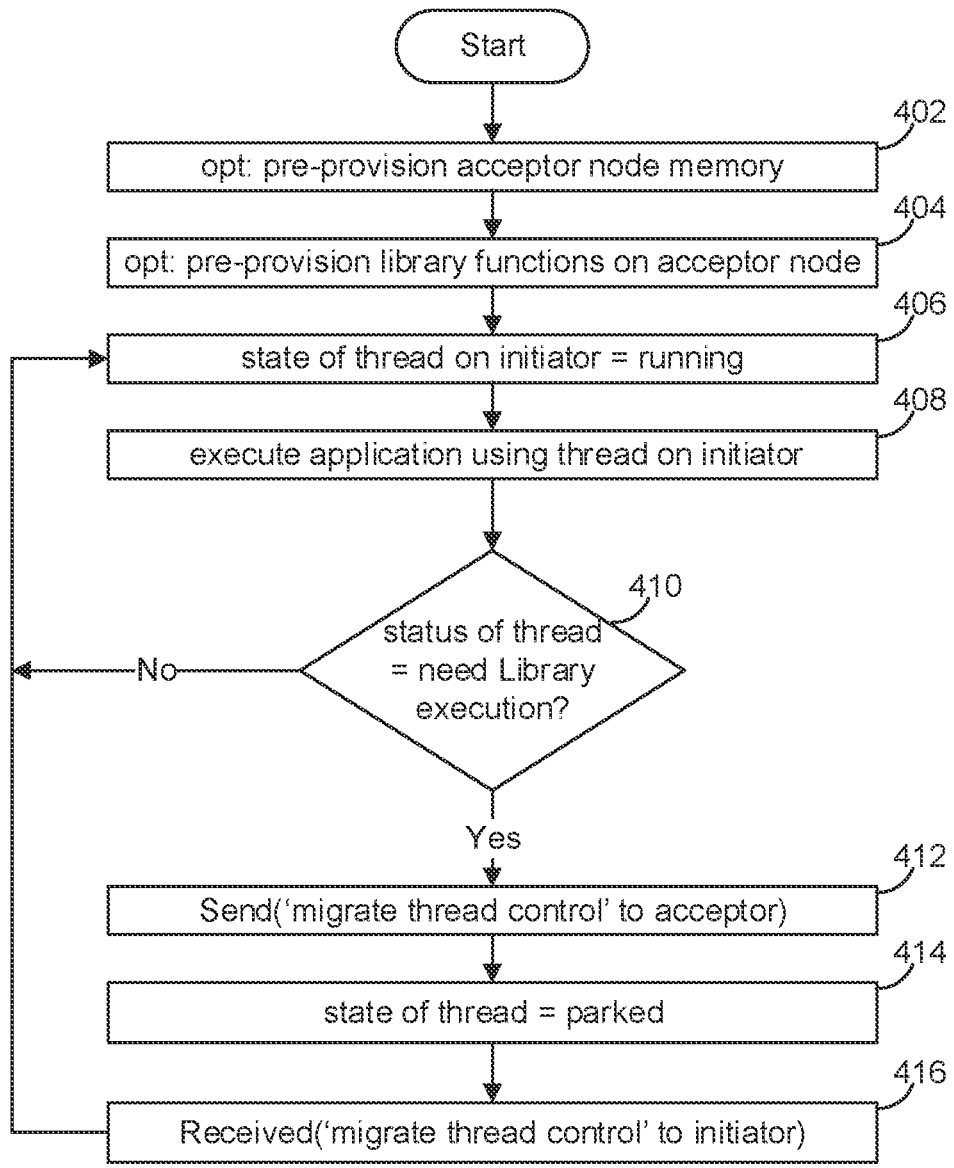
FIG. 4A depicts a flow of operations for running the initiator node.
Figure 4B:
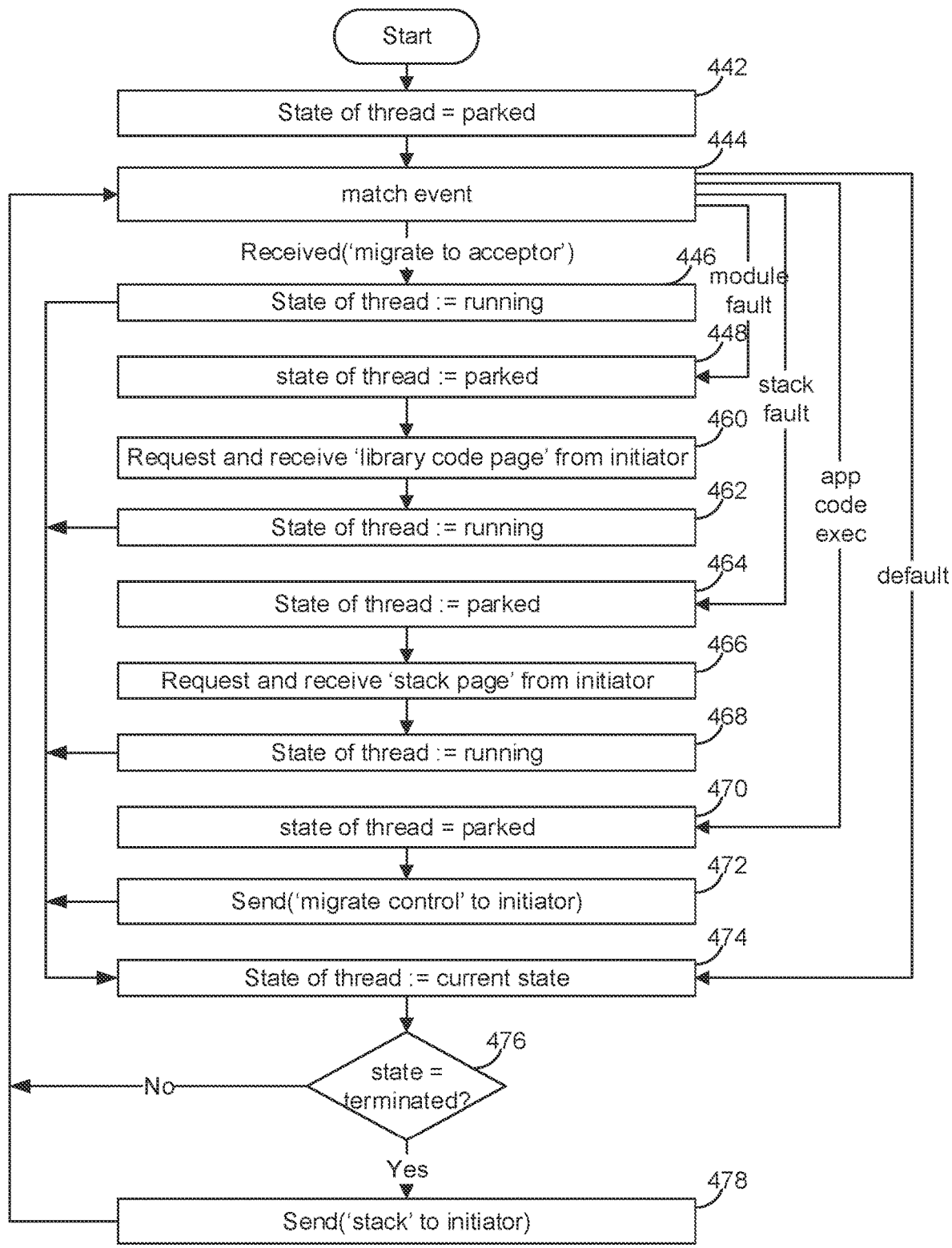
FIG. 4B depicts a flow of operations for running an acceptor node.

FIGS. 4A-4B describes interactions of running the application on the initiator and acceptor nodes after the setup according to FIGS. 3A-3D is completed. These interactions include, in the course of executing the application on the initiator node, executing a library or other deployable module on the acceptor node. Executing the library or other deployable module involves 'faulting in' the code pagers for the library or other deployable module, the data pages of the stack or other memory space, and moving execution back to the initiator node.

FIG. 4A depicts a flow of operations for running the initiator node. In step 402, the initiator node optionally pre-provisions (as further described below) the acceptor node with stack or memory pages anticipated for executing threads on the acceptor node as described below. In step 404, the initiator node optionally pre-provisions the acceptor node (as further described below) with functions of the library or other deployable modules anticipated for the code. In step 406, the state of the thread is set to running. In step 408, the initiator code executes application 214 using the now running thread on the initiator node. In step 410, the thread determines whether the execution of a function of a library or other deployable module is needed. If not, then the thread continues the execution of its workload. If execution of a library or module function is needed, then in step 412, a message is sent to the acceptor node to migrate the workload of the thread to the acceptor node. In step 414, the state of the initiator thread is set to a parked state, which means that the thread is paused but runnable on behalf of a dual thread on the acceptor node. In step 416, the initiator node awaits and receives a message to migrate the workload of the thread back to the initiator node after the acceptor node has finished executing the function of the library or other deployable module.

Pre-provisioning of the memory pages or stack pages is performed by a DWARF-type (debugging with attributed record formats) debugger data. When the initiator node takes a fault on entry to the acceptor-pinned function, it analyzes the DWARF data for the target function, determines that it takes a pointer argument, sends the memory starting at the pointer to the acceptor node, and sends the current page of the stack to the acceptor node. The DWARF debugger data contains the address and sizes of all functions that can be reached from this point in the call graph, allowing the code pages to be sent to the acceptor node prior to being brought in by demand-paging. In this way, the acceptor node can pre-provision the memory it needs to perform its function prior to resuming execution.

FIG. 4B depicts a flow of operations for running an acceptor node. In step 442, the state of the acceptor thread is initially set to parked. In step 444, one of five events occurs on the acceptor node. The events are 'migrate to acceptor', 'module fault', 'stack fault', 'application code execution', or 'default'. The module fault and stack fault, though specifically described below, are examples of a memory fault that may include other types of memory faults, such as a heap fault and code fault (which are not described herein). The different types of memory faults are handled in a similar manner.

If the event is 'migrate to acceptor', then the state of the acceptor thread is set to running in step 446. Flow continues to step 474, which maintains the thread's current state, and to step 476, where the acceptor node determines whether the thread is terminated. If not, control continues to step 444 to await the next event, such as a 'module fault', a 'stack fault', or 'execution of the application'.

If the event is a 'module fault', e.g., a library fault, then the state of the thread is set to parked in step 448, and in step 460, the acceptor node requests and receives a code page of the library or other deployable module not yet paged in from the initiator node. In step 462, the acceptor node sets the state of the acceptor thread to running, and the flow continues with the acceptor thread running through steps 474, 476, 444 to await the next event if the thread is not terminated.

If the event is a 'stack fault', then the thread's state is set to parked in step 464, and the initiator node sends a request to receive a stack page not yet paged in from the initiator node. In step 468, the thread's state is set to running, and the flow continues through steps 474, 476, and 444 to await the next event if the thread is not terminated.

If the event is 'application code execution', then the state of the acceptor thread is set to parked in step 470, and the acceptor node sends a 'migrate control' message to the initiator node in step 472. Flow continues through steps 474, 476, and 444 to await the next event.

If the event is 'default' (i.e., any other event), then the thread's state is maintained in step 474, and flow continues through steps 476 and 444 to await the next event.

If the thread terminates as determined in step 476, the stack of the terminated acceptor thread is sent back to the initiator node in step 478, and flow continues at step 444, awaiting the next event. If no event occurs, then 'default' occurs, which loops via steps 474 and 444 to maintain the thread's current state.

Figure 5A:
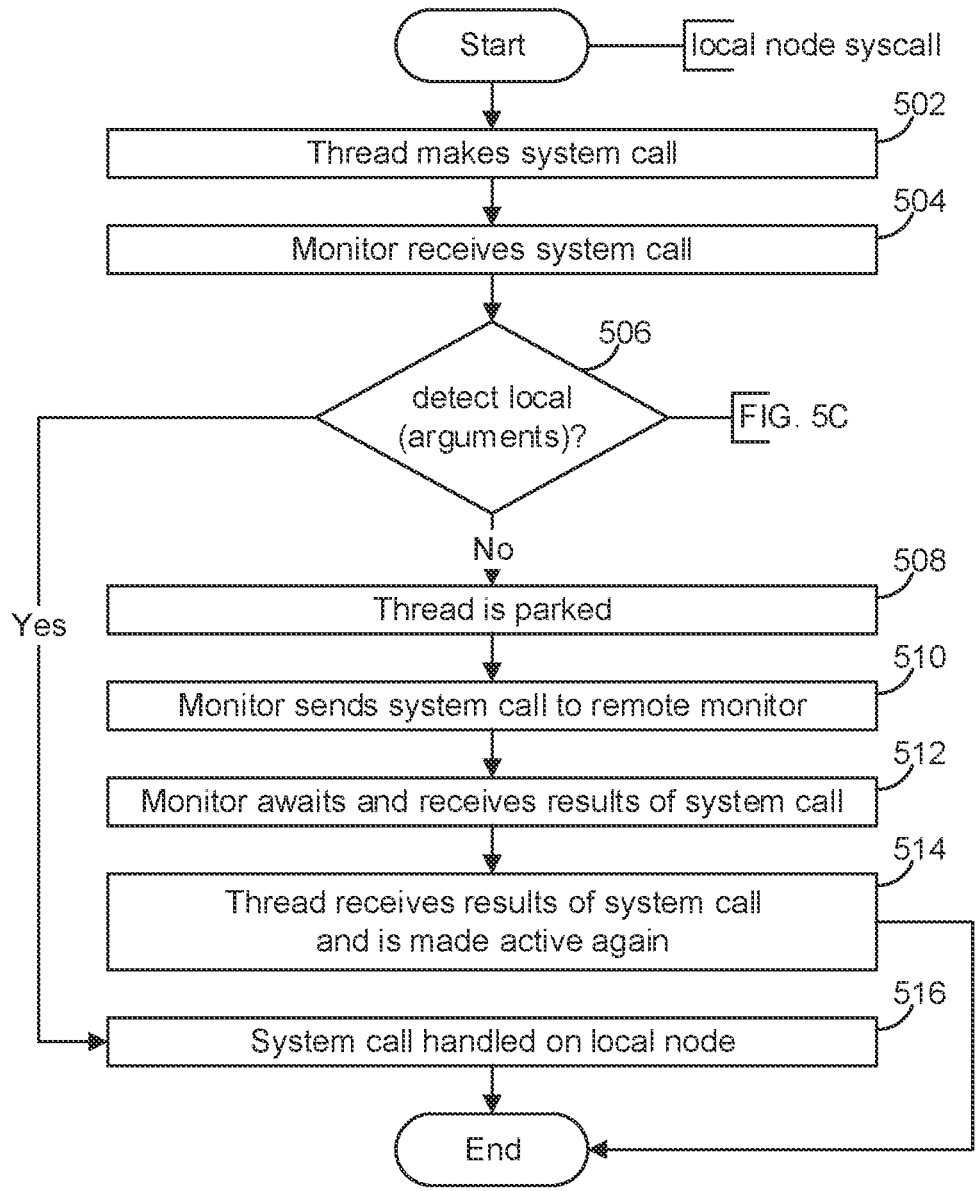
FIG. 5A depicts a flow of operations for implementing a system call on the initiator node.
Figure 5B:
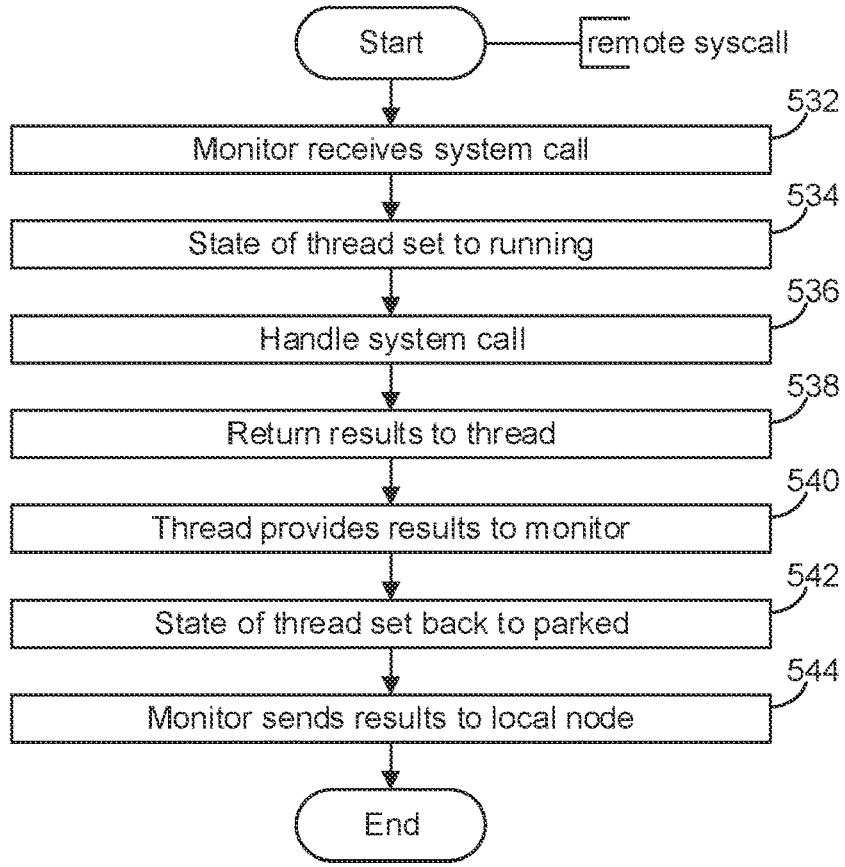
FIG. 5B depicts a flow of operations for implementing a system call on the acceptor node.
Figure 5C:
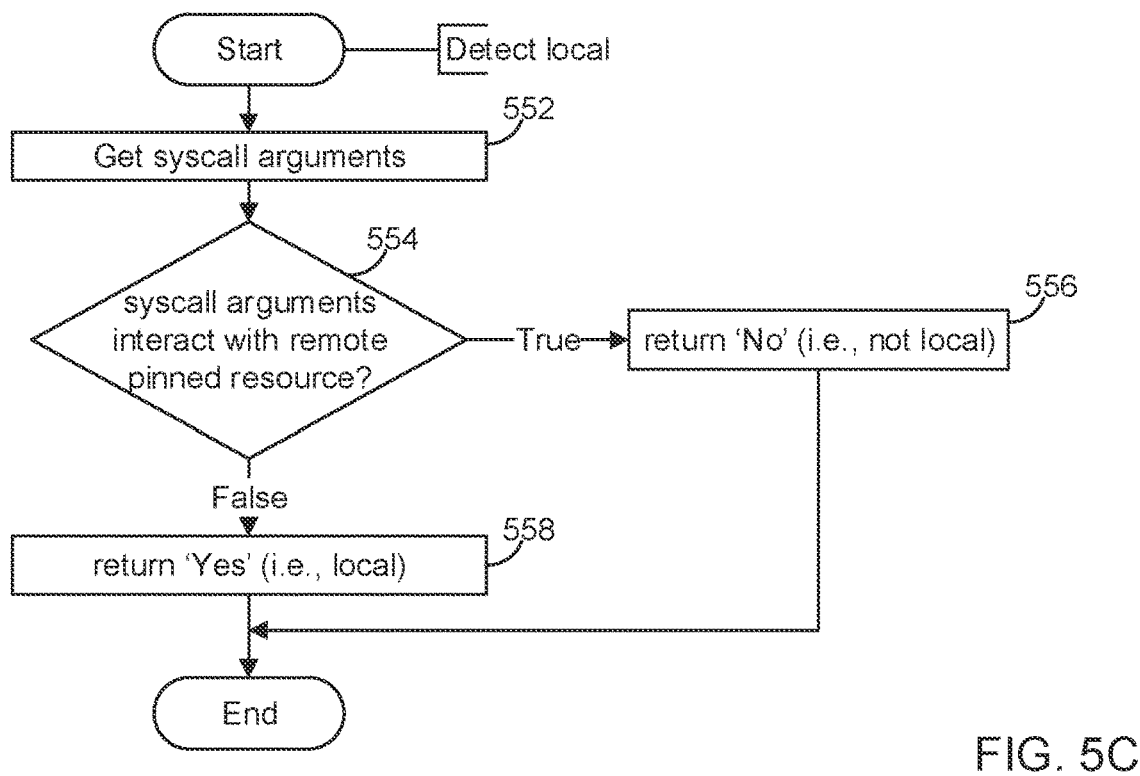
FIG. 5C depicts a flow of operations for implementing a Detect Local function.

Often in the course of execution of the application, operating system services are needed. The application, via the runtime on a particular node, makes system calls to the operating system to obtain these services. However, the particular node making the system call may not have the resources for executing the system call. In these cases, the execution of the system call is moved to a node having the resources. FIGS. 5A-5C depict the flow of operations to execute and possibly move execution of a system call. Specifically, FIG. 5A depicts a flow of operations for implementing a system call on either the initiator node or the acceptor node (hereinafter referred to as the "local node"). FIG. 5B depicts a flow of operations for implementing a system call on the remote node (which is the acceptor node if the local node is the initiator node or the initiator node if the local node is the acceptor node). FIG. 5C depicts a flow of operations for implementing a Detect Local function.

Referring to FIG. 5A, in step 502, a thread running in the local node makes a system call. In step 504, the application monitor on the local node receives the system call via a program that is responsible for manipulating interactions with the virtualization boundary (called VpExit below). In step 506, the application monitor determines whether the arguments involve local or remote resources. In step 508, if the system call involves remote resources ('No' branch), then the running thread is parked, and in step 510, the application monitor sends the system call and its arguments to the application monitor on the acceptor node that is to handle the system call. In step 512, the application monitor on the local node awaits completion and results of the system call, and in step 514, the running thread receives the results of the system call (via VpExit) and is made active again. In step 508, if the system call involves only the local resources ('Yes') branch, then the local node handles the system call in step 516.

Referring now to FIG. 5B, in step 532, the application monitor on the remote node receives the system call and its arguments. In step 534, the state of the parked thread is set to active (i.e., running) and the remote node handles the system call in step 535. In step 538, the results of the system call are returned to the thread that made the call, which provides in step 540 the results to the application monitor, after which, in step 542, the state of the thread is set back to the parked state. In step 544, the application monitor sends the completion and results back to the local node.

Referring now to FIG. 5C, the flow of operations depicted in the figure occurs in response to executing step 506. In step 552, the function gets all of the system call arguments and in step 554 determines for system calls, whether the arguments interact with a resource pinned on a remote node. If so, then the function returns 'No' in step 556. Otherwise, the function returns 'Yes' in step 558.

In the embodiments described above, scheduling and execution of workloads are implemented in a Kubernetes system. It should be understood that other implementations that do not employ Kubernetes are possible. In these other implementations, accelerator hardware is assigned to nodes of a multi-node system. The nodes can be VMs or physical machines running a conventional operating system, and each node has a service that reports to a manager service (running on one of the nodes) what accelerator hardware is available and how well they are utilized at any given moment. In these implementations, the manager service is responsible for selecting an acceptor node from one of the nodes of the multi-node system in accordance with the requirements of the initiator node and instructs a scheduler service running on the acceptor node to deploy an acceptor container (e.g., process container 208).

FIGS. 6-7 depict page state transitions according to the MESL protocol. FIG. 6 depicts page state transitions that occur at a node as a result of actions carried out on that node. FIG. 7 depicts page state transitions that occur at a node in response to actions carried out on a remote node.

As shown in FIGS. 6-7, there are four states for a memory page. The four states include the modified state (M), the shared state (S), the lost state (L), and the exclusive state (E). All states have an associated epoch number e, which is used by the nodes to track whether the memory page has page data that is stale or not. The epoch number is incremented each time the state of the memory page enters the modified state. After the memory page enters the modified state and the epoch number is incremented, the node owning the memory page updates the page data. The same memory page at the other nodes will not have the updated page data and has a state with an epoch number that is smaller (indicating that the page data at the other nodes is stale). All nodes that have the memory page in the shared state have the same copy. The lost state indicates that the memory page at epoch number e cannot be read or written because it is not known if another node has the same memory page with a different epoch number, e.g., e+1. The exclusive state means that only one particular node owns the memory page, but other nodes may have the same memory page with an epoch number that is smaller than or equal to the epoch number c. A read operation may be performed on a memory page that is in the modified state, exclusive state, or the shared state. A write operation may only be performed on a memory page that is in the modified state.

FIG. 8 depicts page state data that are maintained at different nodes to implement the MESL protocol. In the example of the page state data depicted in FIG. 8, it is assumed that four memory pages, pages with page numbers (page #s) 1234, 1235, 1236, and 1237, reside in three different nodes (e.g., nodes A, B, C) each with a unique node ID (nodeID). For each memory page, the following information is tracked: its state (M, E, S, or L), its epoch number, the owner of the memory page, and a count value (CNT) that is representative of the number of times ownership of the memory page has changed without any change in the epoch number. Thus, when a read is requested for a memory page from a remote node, in situations where the memory page at the remote node is currently in the exclusive state, the count value is incremented at the remote node because the memory page will undergo a transition from the exclusive state to the lost state to allow the requesting node to take ownership of the memory page. In addition, the count value for a memory page is reset to zero when the memory page is modified.

Figure 9:
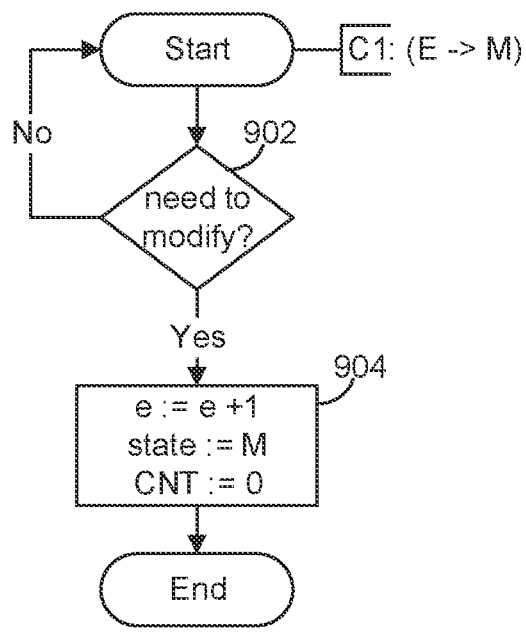
FIGS. 9, 10, 11, 12A, and 12B depict steps of functions that are executed at a node in response to actions carried out at that node.

FIG. 9 depicts the steps of function C1 that are executed at a node when the node needs to modify a local page that is in the E state. If, in step 902, the function determines that the page needs to be modified, it increments the epoch number, e, changes the state of the page to the M state, and resets the count value to zero in step 904.

Figure 10:
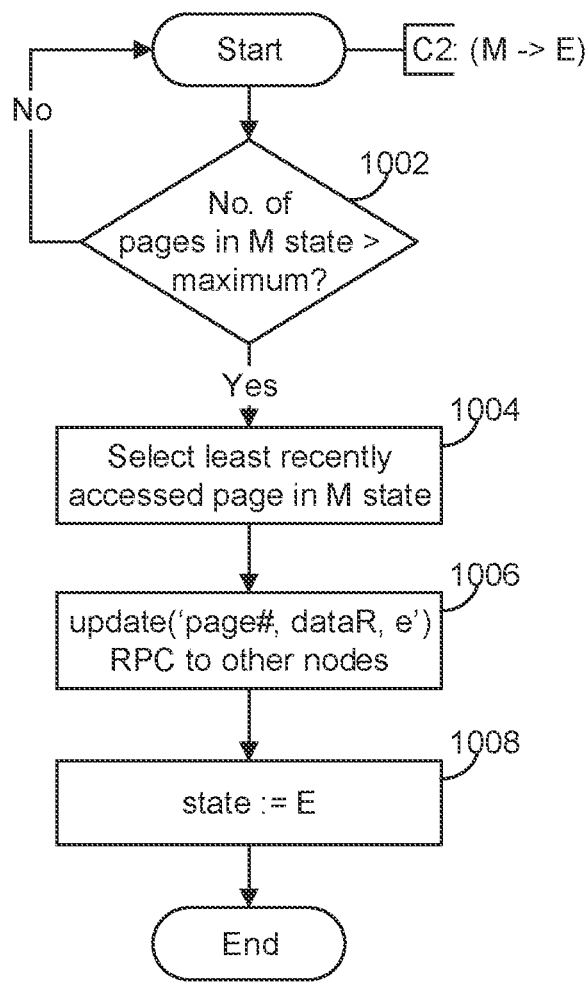

FIG. 10 depicts the steps of function C2 that are executed at a node when the node determines in step 1002 that the number of local pages that are in the M state exceeds a maximum, which is set to limit the count of locally modified pages. If the number of pages that are in the M state exceeds the maximum, the function selects a page in the M state to transition to the E state in step 1004. In one embodiment, the page selection is based on a least recently accessed criteria. In step 1006, the function makes a page-update remote procedure call (RPC) (also referred to herein as a "page update request"), which includes the page number (page #), the page data (dataR), and the epoch number (e) as parameters, to the other nodes to preflush the data and update their corresponding epoch numbers. As a result of this preflush, transmitting the page data during a critical path can be avoided. In step 1008, the function changes the state of the page to the E state.

Figure 11:
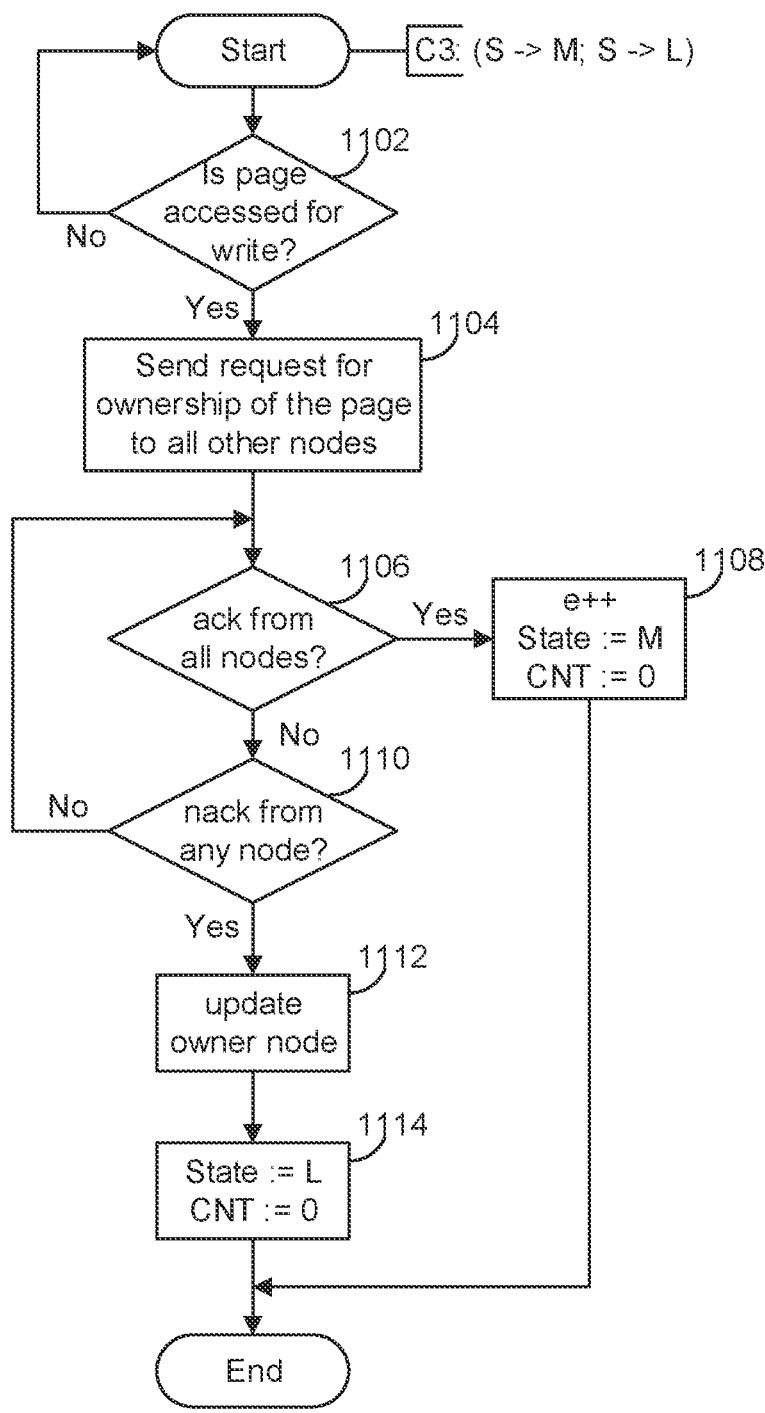

FIG. 11 depicts the steps of function C3 that are executed at a node when the node needs to access a local page that is in the S state for a write. If, in step 1102, the function determines that the page needs to be accessed for a write, it sends out a 'request for ownership' message along with the page number (page #) (or alternatively makes a 'request for ownership' RPC that includes the page number as a parameter) to all of the other nodes in step 1104. Then, in step 1106, the function waits for a positive acknowledgement ('ack') from all of the remote nodes. If the positive acknowledgement is received from all of the remote nodes, the function increments the epoch number, changes the state of the page to the M state, and resets the count value of the page to zero in step 1108. On the other hand, if the function determines in step 1110 that a negative acknowledgement ('nack') is received from any one of the remote nodes, the function in step 1112 updates the owner of the page to the remote node that sent the 'nack' response, and in step 1114 sets the state of the page to the L state and resets the count value of the page to zero. The process ends thereafter. The actions carried out at the remote nodes in response to the 'request for ownership' message are described below in conjunction with FIG. 15 and FIG. 16.

Figure 12A:
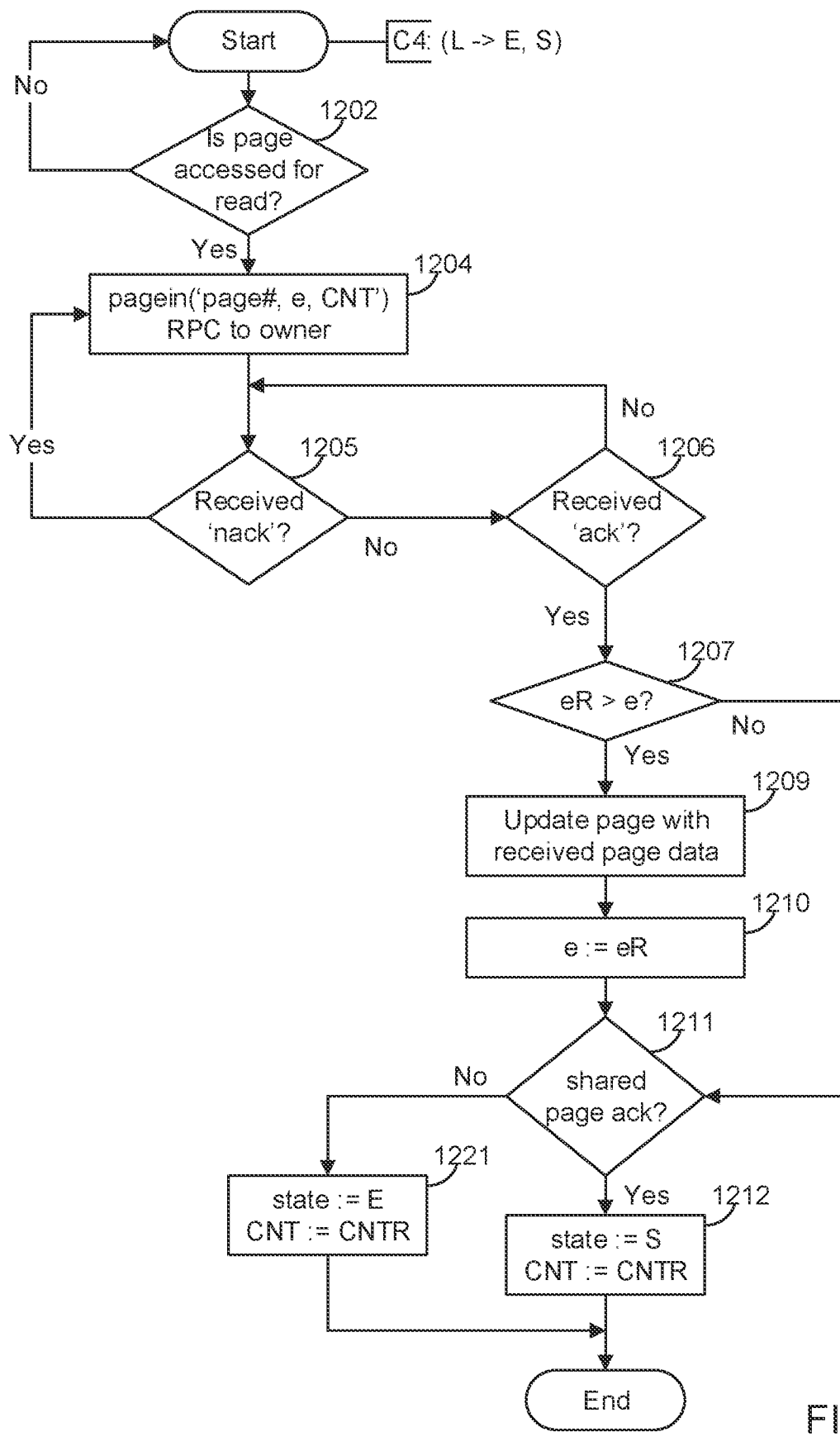

FIG. 12A depicts the steps of function C4 that are executed at a node when the node needs to access a local page that is in the L state for a read. If, in step 1202, the function determines that the page needs to be accessed for a read, it makes a page-in RPC to the owner of the page in step 1204. The page-in RPC (also referred to herein as a "page-in request") includes the page number (page #), the epoch number (e), and the count value (CNT) as parameters. If the node has stale ownership information and sent the request to a remote node that is not the current owner, it receives a negative acknowledgment ('nack') along with new owner information ('nodeID') (step 1205; Yes) in response to the request sent out in step 1204, and step 1204 is re-executed with the new owner information. If the node has correct ownership information, it receives a positive acknowledgment ('ack') along with the page number (page #), the epoch number (eR), and the count value (CNTR) (step 1206; Yes) in response to the request sent out in step 1204. Upon receiving the positive acknowledgment ('ack') along with the page number, the epoch number, and the count value, the function in step 1207 compares the received epoch number (eR) with the epoch number (c) of the local page. If eR is greater than e (step 1207, Yes), the function updates the local page with the page data (dataR) in step 1209, updates the epoch number of the local page to eR in step 1210, and then executes step 1211. If eR is not greater than e (step 1207, No), steps 1209 and 1210 are skipped and step 1211 is executed next.

In step 1211, the function determines if the positive acknowledgement indicates that the page is in the S state at the remote node (e.g., the positive acknowledgement includes <SharedPageData> as one of its parameters). If so, step 1212 is executed. In step 1212, the function changes the state of the local page to the S state and updates the count value of the local page to CNTR. If the positive acknowledgement does not indicate that the page is in the S state at the remote node, the function changes the state of the local page to the E state and updates the count value of the local page to CNTR in step 1221.

Figure 12B:
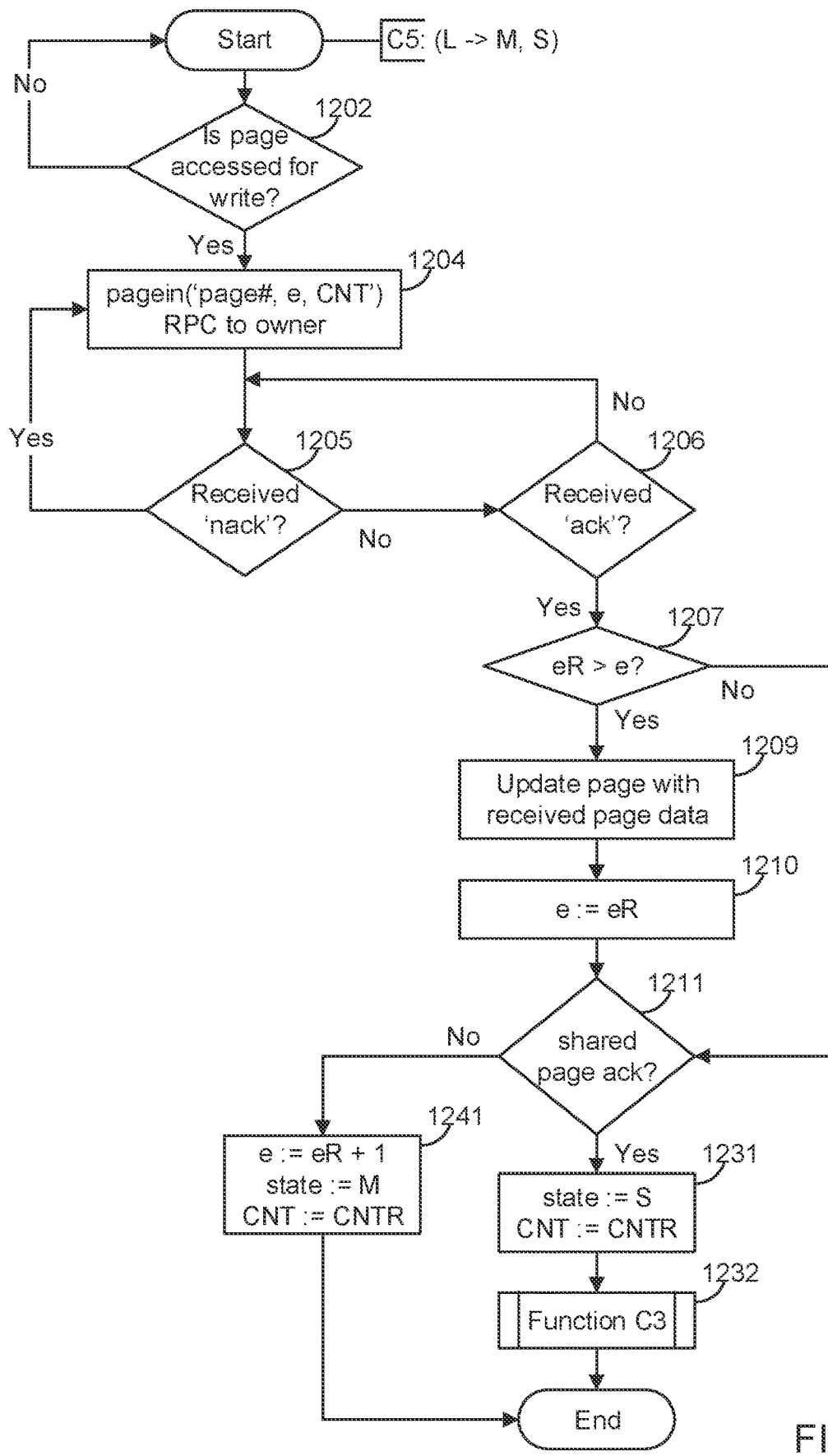

FIG. 12B depicts the steps of function C5 that are executed at a node when the node needs to access a local page that is in the L state for a write. The function executes steps 1202, 1204, 1205, 1206, 1207, 1209, 1210, and 1211 in the same manner as described above for function C4. If the positive acknowledgement indicates that the page is in the S state at the remote node (step 1211, Yes), the function transitions the local page to the S state and updates the count value of the local page to CNTR in step 1231 and executes function C3 described above to transition the local page to the writable state (i.e., the M state) in step 1232. If the positive acknowledgement does not indicate that the page is in the S state at the remote node (step 1211, No), the function updates the epoch number of the local page to eR+1, changes the state of the local page to the M state, and updates the count value of the local page to CNTR in step 1241.

Figure 13A:
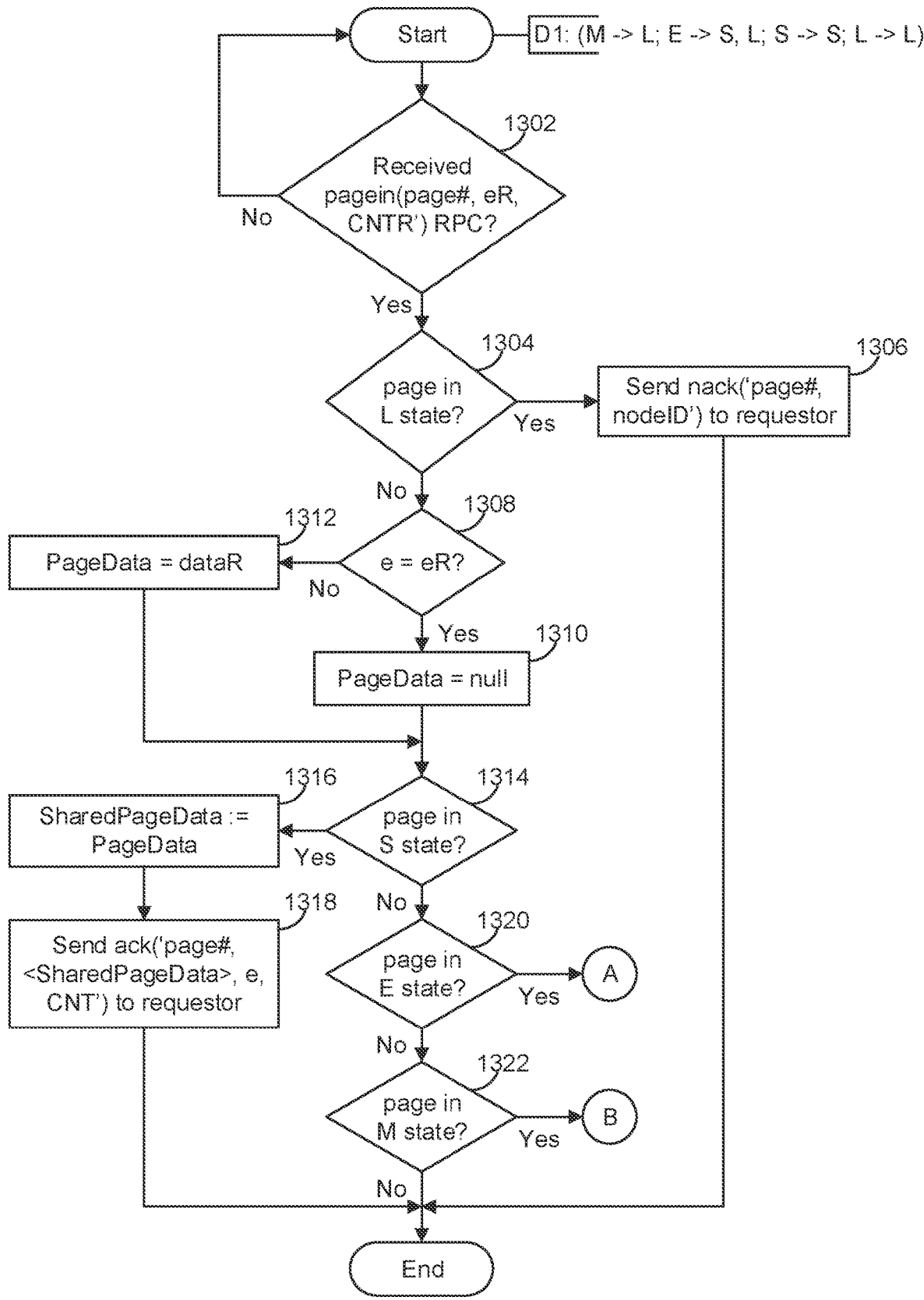
FIGS. 13A, 13B, 14, 15, and 16 depict steps of functions that are executed at a node in response to actions carried out at a remote node.
Figure 13B:
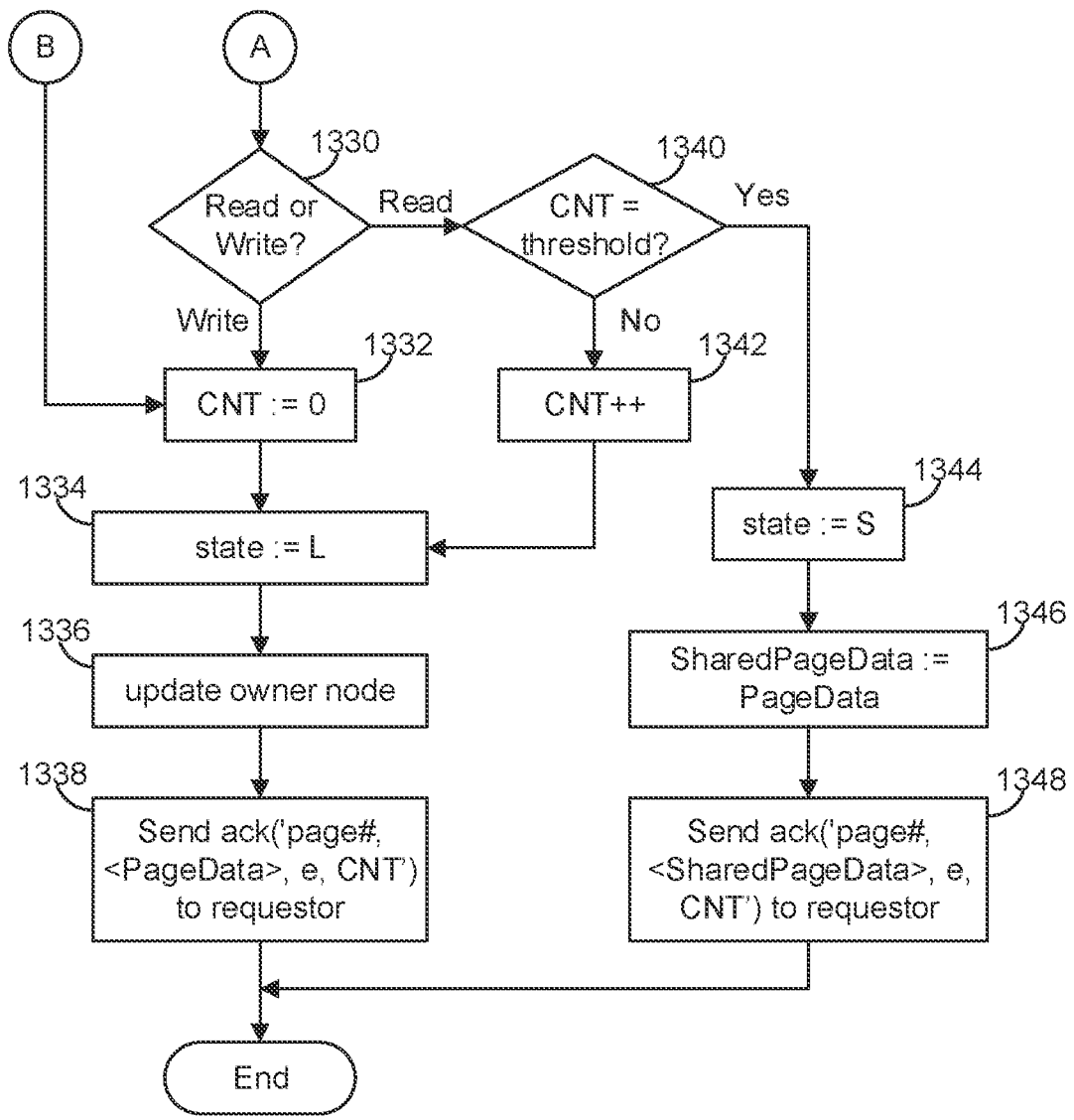

FIGS. 13A and 13B depict the steps of function D1 that are executed at a node when a remote node makes a page-in request. If, in step 1302, the function receives the page-in request along with the page number (page #) and the epoch number (eR), and the count value (CNTR), it determines an appropriate response based upon the contents of the request, as well as the local state of the page. If the function in step 1304 determines that the local state is L, the function in step 1306 issues a negative acknowledgement (hereinafter referred to as a 'nack' response). The 'nack' response includes the page number and the local node's understanding of the current page owner (nodeID). The local state of the page is unchanged. Otherwise, a positive acknowledgement (hereinafter referred to as an 'ack' response) will be generated, and the local state updated, as described below.

The function determines in step 1308 whether the local epoch number, e, matches the received epoch number from the request, eR. If so (step 1308, Yes), the function in step 1310 sets PageData=null so that the 'ack' response that includes PageData as a parameter will not contain the page contents, dataR. On the other hand, if the epoch numbers do not match, the function in step 1312 sets PageData=dataR, so that the 'ack' response will contain the page contents, dataR.

If the function determines in step 1314 that the local node has the page in the S state, an 'ack' response that indicates the remote node should also place the page in S state is issued. This 'ack' response includes SharedPageData as a parameter instead of PageData. In addition, the contents of SharedPageData are the same as the contents of PageData. Thus, the function in step 1316 sets SharedPageData=PageData, and in step 1318 sends the 'ack' response that includes the page number, SharedPageData, the local epoch number, and the local count value as parameters. The process ends thereafter.

If the function determines in step 1320 that the local node has the page in the E state, and the page-in request indicates that the page is being accessed to support a write access (step 1330, Write), the count value is reset to 0 locally (step 1332). Then, the function changes the local state of the page to L in step 1334, updates the owner information to that of the page-in request originator in step 1336, and sends the 'ack' response that includes the page number, PageData, the local epoch number, and the local count value as parameters in step 1338. The process ends thereafter.

Returning to step 1330, if the page-in request indicates that the page is being accessed to support a read access (step 1330, Read), the function in step 1340 determines if the local count value of the page has reached a threshold (e.g., 3). A high count value for a page indicates that the ownership of the memory page is being changed without any updates to the memory page contents. As a result, when the count value reaches the threshold, the page is transitioned to the shared state so that the memory page can be read without any protocol traffic between nodes. If the local count value of the page has not reached the threshold (step 1340, No), the function increments the local count value in step 1342, and thereafter executes steps 1334, 1336, and 1338 as described above. On the other hand, if the local count value of the page has reached the threshold (step 1340, Yes), the function changes the local state of the page to S in step 1344, sets SharedPageData=PageData in step 1346, and sends the 'ack' response that includes the page number, SharedPageData, the local epoch number, and the local count value as parameters in step 1348. The process ends thereafter.

If the function determines in step 1322 that the local node has the page in the M state, the function executes steps 1332, 1334, 1336, and 1338 as described above, and the process ends thereafter.

Figure 14:
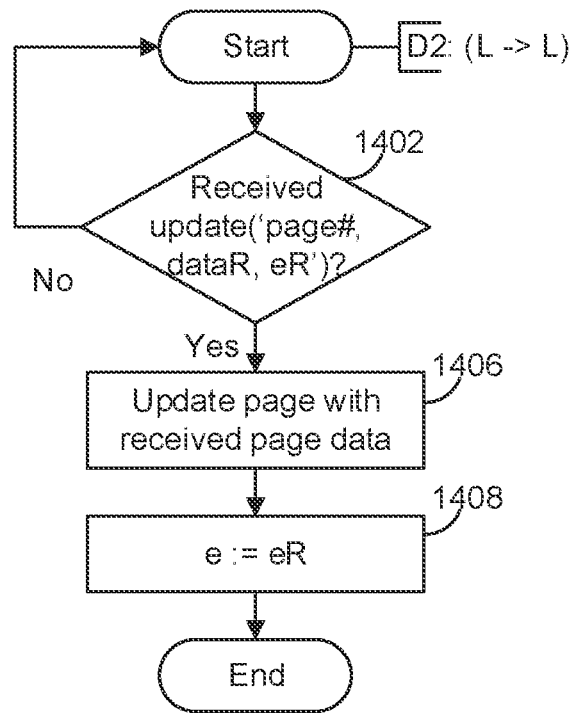

FIG. 14 depicts the steps of function D2 that are executed at a node when a remote node makes a page-update request. If the function in step 1402 receives the page update request along with a page number (page #), page data (dataR), and an epoch number (eR), the function updates the local page having the page number (page #) with the received page data in step 1406. Then, in step 1408, the function updates the epoch number of the local page to the received epoch number, eR.

Figure 15:
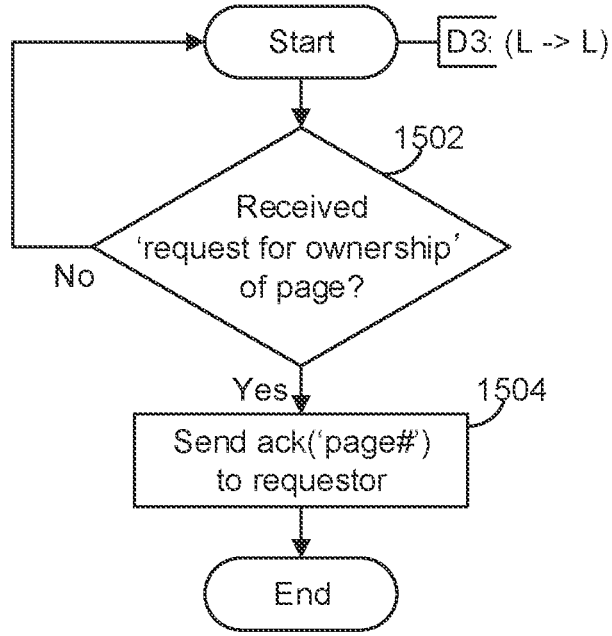

FIG. 15 depicts the steps of function D3 that are executed at a node when the node receives in step 1502 a 'request for ownership' message and a page number (page #) from a remote node, where the page number corresponds to that of a local page that is in the lost state. If received, the function sends a positive acknowledgement along with the page number to the remote node in step 1504.

Figure 16:
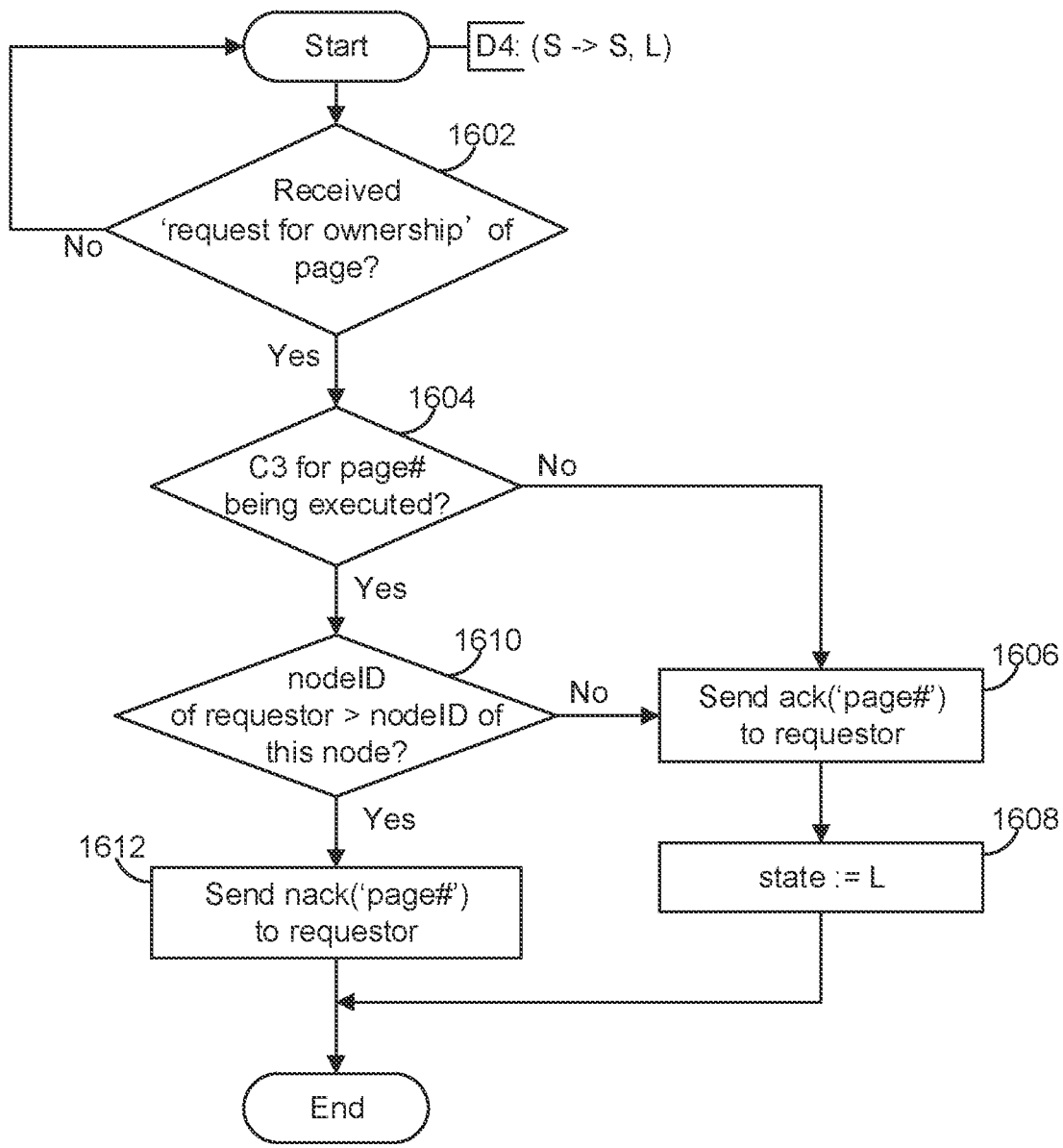

FIG. 16 depicts the steps of function D4 that are executed at a node when the node receives in step 1602 a 'request for ownership' message and a page number (page #) from a remote node, where the page number corresponds to that of a local page that is in the shared state. If received, the function in step 1604 determines if the local node is currently executing function C3 for the same memory page. If not (step 1604, No), the function sends a positive acknowledgement along with the page number to the remote node in step 1606 and changes the state of the local page to the L state in step 1608.

If the local node is currently executing function C3 for the same memory page (step 1604, Yes), this means that two nodes are attempting to modify the same memory page. In the embodiments, the node with a lower value nodeID is given priority. Therefore, the function in step 1610 compares the nodeID of the remote node with the nodeID of the local node. If the nodeID of the remote node is not larger (step 1610, No), the function executes steps 1606 and 1608 as described above. If the nodeID of the remote node is larger (step 1610, Yes), the function executes step 1612. In step 1612, the function sends a negative acknowledgement along with the page number to the remote node.

The embodiments described herein may employ various computer-implemented operations involving data stored in computer systems. For example, these operations may require physical manipulation of physical quantities. Usually, though not necessarily, these quantities may take the form of electrical or magnetic signals, where the quantities or representations of the quantities can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer-readable media. The term computer-readable medium refers to any data storage device that can store data which can thereafter be input to a computer system. Computer-readable media may be based on any existing or subsequently developed technology that embodies computer programs in a manner that enables a computer to read the programs. Examples of computer-readable media are hard drives, NAS systems, read-only memory (ROM), RAM, compact disks (CDs), digital versatile disks (DVDs), magnetic tapes, and other optical and non-optical data storage devices. A computer-readable medium can also be distributed over a network-coupled computer system so that the computer-readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of maintaining coherency among memory residing in each node of a set of nodes that are interconnected by a network and include a first node and a second node, the method comprising:

tracking a state and an epoch number of each page of the memory residing in each of the first node and the second node, wherein the state is one of a modified state, an exclusive state, a shared state, and a lost state in which the page cannot be either read or written, and an epoch number is a number that is incremented each time the page enters the modified state;

in connection with performing a write operation on a first page residing in the first node while the first page is in the shared state, sending a request to the second node that the first node needs ownership of the first page, setting the state of the first page residing in the first node to the modified state, and incrementing the epoch number of the first page residing in the first node; and in connection with performing a read operation on a second page residing in the first node while the second page is in the lost state, sending a request to the second node that the first node needs to access the second page, and setting the state of the second page residing in the first node to the exclusive state.

2. The method of claim 1, further comprising:

while the first page residing in the first node is in the modified state, in response to receiving a request for access to the first page from the second node, setting the state of the first page residing in the first node to the lost state, and sending a positive acknowledgment to the second node; and while the second page residing in the first node is in the exclusive state, in response to receiving a request to access the second page from the second node, setting the state of the second page residing in the first node to the lost state, and sending a positive acknowledgment to the second node.

3. The method of claim 1, further comprising:

while the first page residing in the first node is in the modified state, sending page data of the first page residing in the first node to the second node and then transitioning the state of the first page residing in the first node from the modified state to the exclusive state.

4. The method of claim 3, further comprising:

determining that the number of pages residing in the first node that are in the modified state exceeds a maximum, wherein the page data of the first page residing in the first node is sent to the second node and the state of the first page residing in the first node is transitioned from the modified state to the exclusive state responsive to determining that the number of pages residing in the first node that are in the modified state exceeds the maximum.

5. The method of claim 4, wherein the second node also receives an epoch number with the page data of the first page from the first node, and the second node updates the first page residing in the second node with the page data of the first page received from the first node, and updates the epoch number of the second page residing in the second node with the epoch number received from the first node.

6. The method of claim 1, further comprising:
while a third page residing in the first node is in the shared state, in response to receiving a request for ownership of the third page, setting the state of the third page residing in the first node to the lost state.

7. The method of claim 1, further comprising:
while a third page residing in the first node is in the modified state or the exclusive state, in response to receiving a request for access to the third page, setting the state of the third page residing in the first node to the lost state, and sending a positive acknowledgment to the second node, wherein the positive acknowledgement includes page data of the third page residing in the first node.

8. The method of claim 1, further comprising:
while the second page residing in the first node is in the exclusive state, in response to receiving the request to access the second page from the second node, setting the state of the second page residing in the first node to the lost state and incrementing a count value for the second page, and sending a positive acknowledgment to the second node,
wherein the positive acknowledgement includes the count value for the second page, and the second page transitions to the shared state when a node owning the second page receives a request to access the second page when the count value has reached a threshold.

9. A computing system including a set of nodes that are interconnected by a network and include a first node and a second node, wherein each of the nodes includes a processor that is programmed to carry out a method of maintaining coherency among memory residing in each node, said method comprising:
tracking a state and an epoch number of each page of the memory residing in each of the first node and the second node, wherein the state is one of a modified state, an exclusive state, a shared state, and a lost state in which the page cannot be either read or written, and an epoch number is a number that is incremented each time the page enters the modified state;
in connection with performing a write operation on a first page residing in the first node while the first page is in the shared state, sending a request to the second node that the first node needs ownership of the first page, setting the state of the first page residing in the first node to the modified state, and incrementing the epoch number of the first page residing in the first node; and
in connection with performing a read operation on a second page residing in the first node while the second page is in the lost state, sending a request to the second node that the first node needs to access the second page, and setting the state of the second page residing in the first node to the exclusive state.

10. The computing system of claim 9, wherein the method further comprises:
while the first page residing in the first node is in the modified state, in response to receiving a request for access to the first page from the second node, setting the state of the first page residing in the first node to the lost state, and sending a positive acknowledgment to the second node; and
while the second page residing in the first node is in the exclusive state, in response to receiving a request to access the second page from the second node, setting the state of the second page residing in the first node to the lost state, and sending a positive acknowledgment to the second node.

11. The computing system of claim 9, wherein the method further comprises:
while the first page residing in the first node is in the modified state, sending page data of the first page residing in the first node to the second node and then transitioning the state of the first page residing in the first node from the modified state to the exclusive state.

12. The computing system of claim 11, wherein the method further comprises:
determining that the number of pages residing in the first node that are in the modified state exceeds a maximum, wherein
the page data of the first page residing in the first node is sent to the second node and the state of the first page residing in the first node is transitioned from the modified state to the exclusive state responsive to determining that the number of pages residing in the first node that are in the modified state exceeds the maximum.

13. The computing system of claim 12, wherein
the second node also receives an epoch number with the page data of the first page from the first node, and
the second node updates the first page residing in the second node with the page data of the first page received from the first node, and updates the epoch number of the second page residing in the second node with the epoch number received from the first node.

14. The computing system of claim 9, wherein the method further comprises:
while a third page residing in the first node is in the shared state, in response to receiving a request for ownership of the third page, setting the state of the third page residing in the first node to the lost state.

15. The computing system of claim 9, wherein the method further comprises:
while a third page residing in the first node is in the modified state or the exclusive state, in response to receiving a request for access to the third page, setting the state of the third page residing in the first node to the lost state, and sending a positive acknowledgment to the second node, wherein the positive acknowledgement includes page data of the third page residing in the first node.

16. The computing system of claim 9, wherein the method further comprises:
while the second page residing in the first node is in the exclusive state, in response to receiving the request to access the second page from the second node, setting the state of the second page residing in the first node to the lost state and incrementing a count value for the second page, and sending a positive acknowledgment to the second node,
wherein the positive acknowledgement includes the count value for the second page, and the second page transitions to the shared state when a node owning the second page receives a request to access the second page when the count value has reached a threshold.

17. A non-transitory computer readable medium comprising instructions to be executed in a processor of a computer system to carry out a method of maintaining coherency among memory residing in each node of a set of nodes that are interconnected by a network and include a first node and a second node, said method comprising:

tracking a state and an epoch number of each page of the memory residing in each of the first node and the second node, wherein the state is one of a modified state, an exclusive state, a shared state, and a lost state in which the page cannot be either read or written, and an epoch number is a number that is incremented each time the page enters the modified state;

in connection with performing a write operation on a first page residing in the first node while the first page is in the shared state, sending a request to the second node that the first node needs ownership of the first page, setting the state of the first page residing in the first node to the modified state, and incrementing the epoch number of the first page residing in the first node; and in connection with performing a read operation on a second page residing in the first node while the second page is in the lost state, sending a request to the second node that the first node needs to access the second page, and setting the state of the second page residing in the first node to the exclusive state.

18. The non-transitory computer readable medium of claim 17, wherein the method further comprises:

while the first page residing in the first node is in the modified state, in response to receiving a request for access to the first page from the second node, setting the state of the first page residing in the first node to the lost state, and sending a positive acknowledgment to the second node; and while the second page residing in the first node is in the exclusive state, in response to receiving a request to access the second page from the second node setting the state of the second page residing in the first node to the lost state, and sending a positive acknowledgment to the second node.

19. The non-transitory computer readable medium of claim 17, wherein the method further comprises:

while a third page residing in the first node is in the shared state, in response to receiving a request for ownership of the third page, setting the state of the third page residing in the first node to the lost state.

20. The non-transitory computer readable medium of claim 17, wherein the method further comprises:

while a third page residing in the first node is in the modified state or the exclusive state, in response to receiving a request for access to the third page, setting the state of the third page residing in the first node to the lost state, and sending a positive acknowledgment to the second node, wherein the positive acknowledgement includes page data of the third page residing in the first node.

\* \* \* \* \*